United States Patent
Lin et al.

(10) Patent No.: US 10,050,863 B2
(45) Date of Patent: Aug. 14, 2018

(54) NETWORK COMMUNICATION SYSTEM, SOFTWARE-DEFINED NETWORK CONTROLLER AND ROUTING METHOD THEREOF

(71) Applicant: National Chiao Tung University, Hsinchu (TW)

(72) Inventors: Ying-Dar Lin, Taipei (TW); Cheng-Ying Wu, Hsinchu (TW); Po-Ching Lin, New Taipei (TW); Yuan-Cheng Lai, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 369 days.

(21) Appl. No.: 15/134,390

(22) Filed: Apr. 21, 2016

(65) Prior Publication Data

US 2017/0207994 A1    Jul. 20, 2017

(30) Foreign Application Priority Data

Jan. 20, 2016   (TW) .............. 105101692 A

(51) Int. Cl.
*H04L 12/751* (2013.01)
*H04L 12/721* (2013.01)
*H04L 12/771* (2013.01)

(52) U.S. Cl.
CPC .............. *H04L 45/02* (2013.01); *H04L 45/26* (2013.01); *H04L 45/56* (2013.01)

(58) Field of Classification Search
CPC .......... H04L 45/02; H04L 45/26; H04L 45/56
See application file for complete search history.

(56) References Cited

U.S. PATENT DOCUMENTS 8,804,490 B2    8/2014 Tatipamula et al.
8,817,625 B1    8/2014 Zhang et al.
(Continued)

FOREIGN PATENT DOCUMENTS

CN    102972009    3/2013
CN    104519121    4/2015
(Continued)

OTHER PUBLICATIONS

Qazi et al., "SIMPLE-fying Middlebox Policy Enforcement Using SDN," SIGCOMM'13, Aug. 2013, pp. 27-38.
(Continued)

*Primary Examiner* — Siming Liu
(74) *Attorney, Agent, or Firm* — JCIPRNET

(57) ABSTRACT

A network communication system, a software-defined network controller and a routing method thereof are provided. The routing method is adapted to the software-defined network controller. The routing method includes the following steps: determining a first root switch corresponding to at least one first service cluster according to service chaining information, wherein each of the at least one first service cluster includes at least one service node for providing a first service; determining first routing path information for routing a packet flow from a first target switch to the first root switch; and configuring first group entry information for the first root switch according to cluster information of the at least one first service cluster, wherein the first group entry information is for performing a first routing path selection of the packet flow corresponding to the first service by the first root switch.

22 Claims, 4 Drawing Sheets

(56) References Cited

U.S. PATENT DOCUMENTS

| 8,953,618 B2 | 2/2015 | Mishra et al. |
| 2014/0254374 A1 | 9/2014 | Janakiraman et al. |
| 2015/0092551 A1* | 4/2015 | Moisand ............ H04L 12/4633 370/235 |

FOREIGN PATENT DOCUMENTS

| TW | 201524169 | 6/2015 |
| TW | 201618503 | 5/2016 |

OTHER PUBLICATIONS

Handigol et al, "Plug-n-Serve: Load-Balancing Web Traffic using OpenFlow," ACM Sigcomm Demo, Aug. 2009, pp. 1-2.

Uppal et al., "OpenFlow Based Load Balancing," University of Washington CSE561: Networking Project Report, Spring 2010, pp. 1-7.

Koerner et al., " Multiple Service Load-Balancing with OpenFlow," 2012 IEEE 13th International Conference on High Performance Switching and Routing, Jun. 2012, pp. 210-214.

"Office Action of Taiwan Counterpart Application," dated Mar. 27, 2017, p. 1-p. 10, in which the listed references were cited.

\* cited by examiner

NETWORK COMMUNICATION SYSTEM, SOFTWARE-DEFINED NETWORK CONTROLLER AND ROUTING METHOD THEREOF

CROSS-REFERENCE TO RELATED APPLICATION

This application claims the priority benefit of Taiwan application serial no. 105101692, filed on Jan. 20, 2016. The entirety of the above-mentioned patent application is hereby incorporated by reference herein and made a part of this specification.

BACKGROUND OF THE INVENTION

1. Field of the Invention

The invention relates to a routing method, and more particularly, to a network communication system, a software-defined network controller and a routing method thereof.

2. Description of Related Art

Software-defined network (SDN) is a network virtualization technology. SDN overturns the long-standing network architecture by changing control mode of traditional network architecture from distributed control into centralized control, so that network equipments tend to be more standardized and simplified. SDN becomes the focus of development in the next generation network technology since it not only can improve flexibility and performance in network operation, but also reduce operational management costs.

The main concept of the SDN technology is to adopt a generic "data flow table" for data exchange. The routing and exchanging information in the network may be expressed as a data flow to be stored into the data flow table. Each data flow entry in the data flow table may be used to describe forwarding policy, data operation, data state and the like.

A SDN network generally includes at least one network equipments (e.g., a SDN switch) and a SDN controller. The SDN controller is charge of a routing control for generating the data flow table according user's configuration or a dynamically operated protocol and transmitting the data flow table to the SDN switch. The SDN switch is in charge of a data forwarding based on the data flow table, and is configured to match and process packets according to the data flow table when receiving the data flow table from the SDN controller. In other words, the SDN controller can issue the data flow table to the SDN switch through a control channel, so as to achieve the data forwarding and realize separation of the data forwarding from the routing control.

With rapid development and increasing traffic of the Internet, accessing traffic of network-based data also shows a rapid growth, which is hard to be handled simply by using one single server. In order to provide a better service quality, services must be provided by deploying a large amount of service nodes for providing the same service. A load balancing technology may be used to spread the service traffic across different nodes for processing.

However, if a service chaining is further introduced to the nodes for providing the same service when the SDN controller adopts the centralized management, in order to achieve the load balancing during the service chaining of network traffic, chaining of the service nodes and establishment of routing paths thereof may result in an excessive setting for the data flow table entry. This means that the SDN controller has to store a massive amount of data flow table entries, which leads to overloading.

In other words, it is one of the most concerned issues for person skilled in the art as how to develop a method for the SDN controller to reduce the loading thereof during the service chaining in the SDN network.

SUMMARY OF THE INVENTION

Accordingly, the invention is directed to a network communication system, a software-defined network (SDN) controller and a routing method thereof, and the invention only needs to control the service chaining of the root switches and establishment of the routing paths thereof, whereas the selection of the service nodes may be separately performed by using the group table. As a result, the loading of the SDN controller may be reduced while achieving the load balancing of the service nodes.

The invention provides a routing method adapted to a SDN controller. The routing method includes: determining a first root switch corresponding to at least one first service cluster according to service chaining information, wherein each service cluster among the at least one first service cluster includes at least one service node for providing a first service; determining first routing path information for routing a packet flow from a first target switch to the first root switch; and configuring first group entry information for the first root switch according to cluster information of the at least one first service cluster, wherein the first group entry information is for performing a first routing path selection of the packet flow corresponding to the first service by the first root switch.

The invention provides a software-defined network controller. The software-defined network controller includes a network interface circuit, a storage circuit and a processing circuit. The storage circuit is configured to store service chaining information. The processing circuit is coupled to the network interface circuit and the storage circuit. The processing circuit is configured to determine a first root switch corresponding to at least one first service cluster according to the service chaining information, wherein each service cluster among the at least one first service cluster includes at least one service node for providing a first service. The processing circuit is further configured to determine first routing path information for routing a packet flow from a first target switch to the first root switch. The processing circuit is further configured to configure first group entry information for the first root switch according to cluster information of the at least one first service cluster, wherein the first group entry information is for performing a first routing path selection of the packet flow corresponding to the first service by the first root switch.

The invention provides a network communication system. The network communication system includes a SDN controller and a plurality of switches. The SDN controller is configured to determine a first root switch corresponding to at least one first service cluster and a second root switch corresponding to at least one second service cluster from among the switches according to service chaining information. Each service cluster among the at least one first service cluster includes at least one service node for providing a first service. Each service cluster among the at least one second service cluster includes at least one service node for providing a second service. The SDN controller is further configured to determine routing path information for routing a packet flow from the first root switch to the second root switch. The SDN controller is further configured to configure first group entry information for the first root switch according to cluster information of the at least one first service cluster and configure second group entry information for the second root switch according to cluster information of the at least one second service cluster. The first root switch is configured to perform a first path selection of the packet flow corresponding to the first service according to the first group entry information. The second root switch is configured to perform a second routing path selection of the packet flow corresponding to the second service according to the second group entry information.

Based on the above, in the network communication system, the SDN controller and the routing method thereof according to the embodiments of the invention, the SDN controller only needs to control the service chaining of the root switches and establishment of the routing paths thereof, whereas the selection of the service nodes may be separately performed by using the group table. As a result, the loading of the SDN controller may be reduced while achieving the load balancing of the service nodes.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
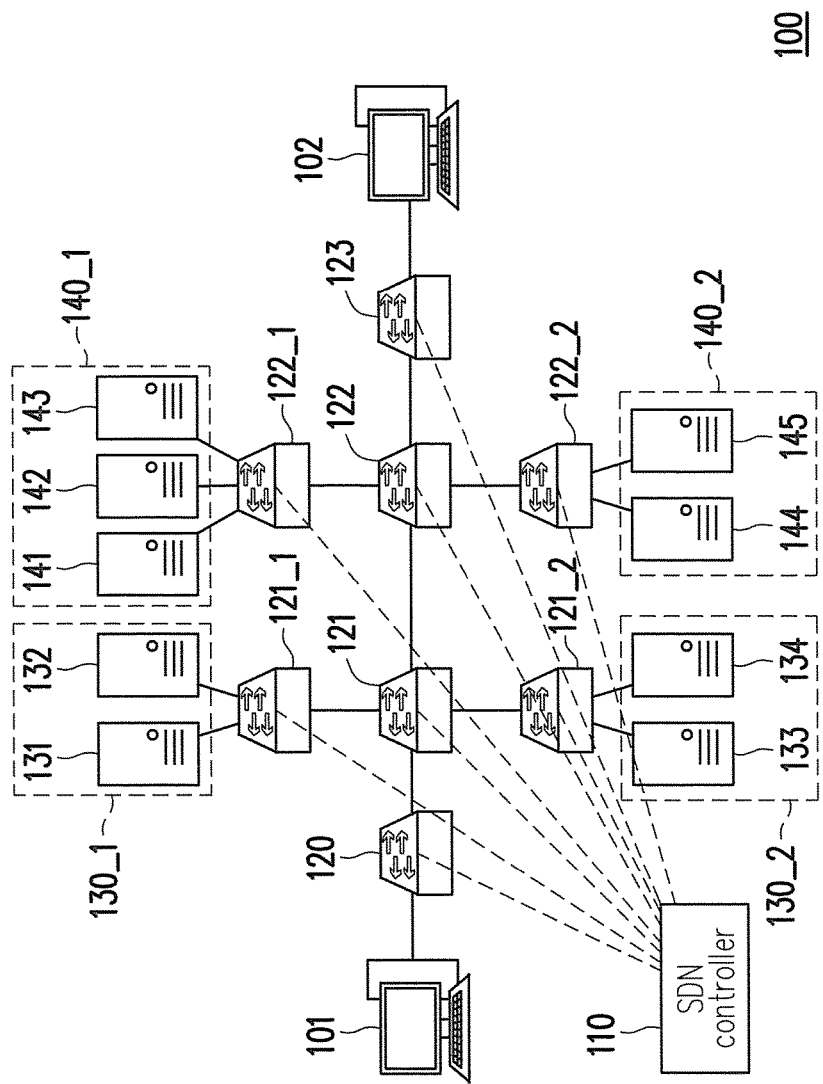
FIG. 1 is a schematic diagram illustrating a network communication system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram illustrating a network communication system according to an embodiment of the invention. Referring to FIG. 1, a network communication system 100 is a software-defined Network (SDN), which includes a source node 101, a destination node 102, a SDN controller 110, a plurality of switches (the present embodiment is described by using switches 120, 121, 121_1, 121_2, 122, 122_1, 122_2 and 123 for example, but not limited thereto), first service clusters 130_1 and 130_2, and second service clusters 140_1 and 140_2. Nonetheless, it should be understood that, the example of FIG. 1 is merely exemplary instead of limitations to the invention.

In the present embodiment, the source node 101 may be a source device or a switch node, and the destination node 102 may also be the switch node or a terminal device. For example, each of the source node 101 and the destination node 102 may be a network communication device such as smart phones, tablet computers, notebook computers and the like, or a network communication device having network management functions such as servers, workstations, routers and the like. The SDN controller 110 is a network control device having the SDN functionality, which may be a physical device such as base stations or access points, or a virtual machine configured in an electronic device. In addition, all the switches 120, 121, 121_1, 121_2, 122, 122_1, 122_2 and 123 as described herein are the physical switch having the SDN functionality, or the virtual machine configured in the electronic device(s), such as Open vSwitch. Alternatively, each switch may also refer to any network communication device supporting routing mechanism, such as a router and the like.

In the present embodiment, the first service clusters 130_1 and 130_2 include service nodes 131 to 132 and 133 to 134 respectively, which are service nodes capable of providing a first service. The second service clusters 140_1 and 140_2 include service nodes 141 to 143 and 144 to 145 respectively, which are service nodes capable of providing a second service. Herein, the first service is different from the second service. In the present embodiment, each of the service nodes 131 to 134 and 141 to 145 may be a physical device for providing any service or may be disposed on a physical device in a manner of virtual machine. Further, the first and second services provided by the service nodes 131 to 134 and 141 to 145 may be various services, such as the firewall or the load balancing, which is not limited by the invention.

Figure 2:
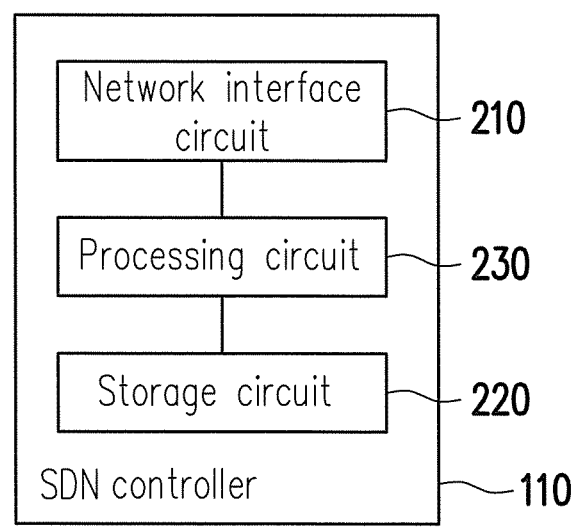
FIG. 2 illustrates a block diagram of the software-defined network (SDN) controller in FIG. 1.

FIG. 2 illustrates a block diagram of the SDN controller 110 in FIG. 1. Referring to FIG. 2, the SDN controller 110 includes a network interface circuit 210, a storage circuit 220 and a processing circuit 230. The processing circuit 230 is coupled to the network interface circuit 210 and the storage circuit 220.

In the present embodiment, the network interface circuit 210 may include a wired and/or wireless network card. The network interface circuit 210 is configured to connect to a network (e.g., the Internet). The SDN controller 110 may exchange network messages with multiple switches (e.g., the switches 120, 121, 121_1, 121_2, 122, 122_1, 122_2 and 123) through the network interface circuit 210.

The storage circuit 220 is, for example, a fixed or a movable device in any possible forms including a random access memory (RAM), a read-only memory (ROM), a flash memory or other similar devices, or a combination of the above-mentioned devices. In the present embodiment, the processing circuit 220 is at least configured to store service chaining information in order to realize a routing method according to the embodiments of the invention.

Specifically, the service chaining information includes a list of services that a packet flow transmitted from any source node to one specific destination node (e.g., the destination node 102) needs to go through and a priority sequence thereof. For example, in the present embodiment, the SDN controller 110 may inquire the service chaining information corresponding to the destination node 102 to learn that the packet flow transmitted from the source node 101 to the destination node 102 needs to be processed by the first service and the second service, sequentially. The packet flow mentioned herein may be constituted by one or more network packets. Further, the storage circuit 220 may also store various routing tables or management tables, such as a data flow table.

The processing circuit 230 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. In the present embodiment, the processing circuit 230 is configured to access data stored in the storage unit 220 and is in charge of overall operation of the SDN controller 110.

Figure 3:
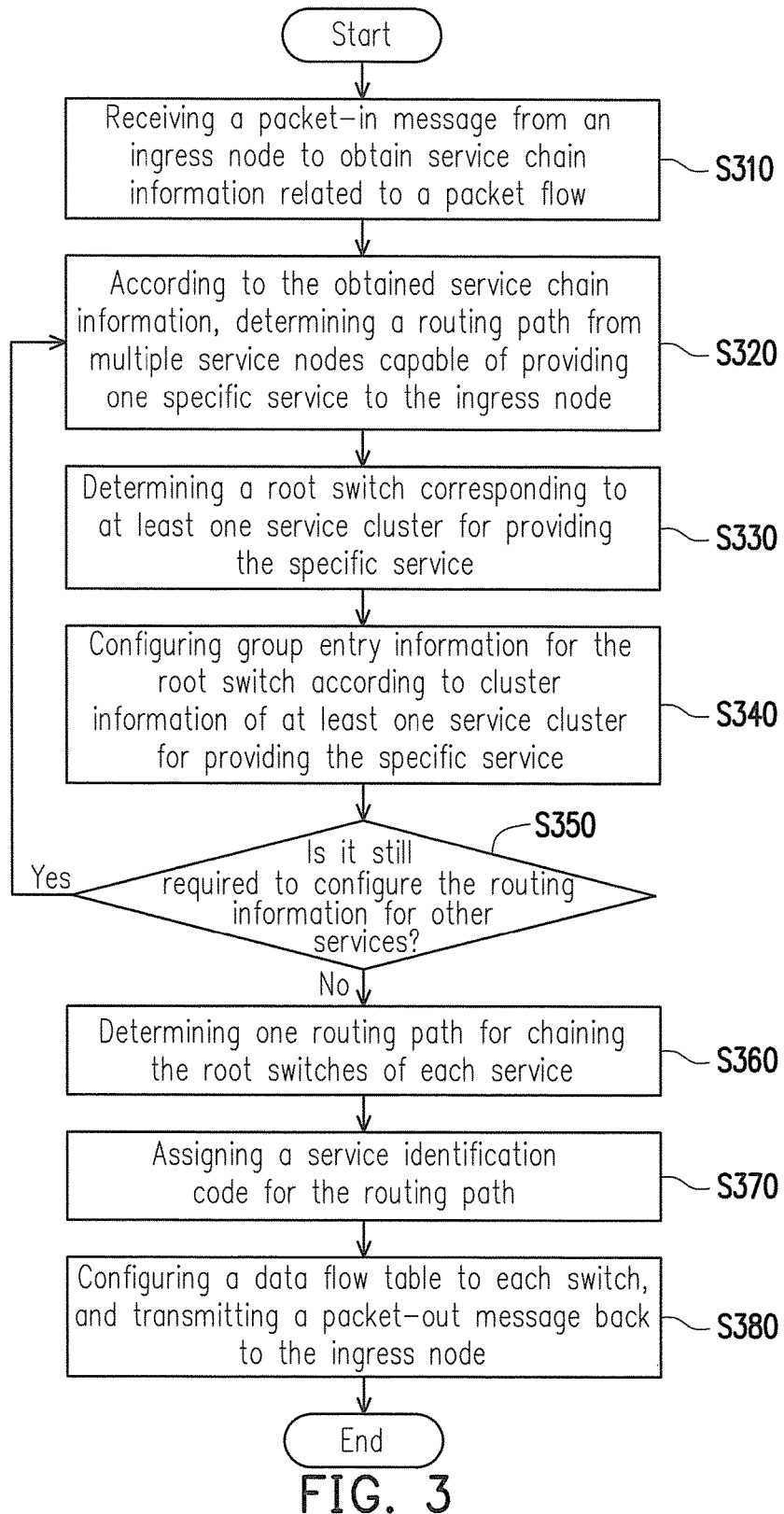
FIG. 3 is a flowchart illustrating the routing method according to an embodiment of the invention.

FIG. 3 is a flowchart illustrating the routing method according to an embodiment of the invention. In the present embodiment, it is assumed that the packet flow needs to go through the service of any service node among the first service clusters 130_1 and 130_2 and the service of any service node among the second service clusters 140_1 and 140_2 before the packet flow is transmitted to the destination node 102 from the source node 101 in the network communication system 100. Accordingly, the SDN controller 110 can set related routing information in the network communication system 100 by performing the routing method in FIG. 3. Detailed steps of the routing method in FIG. 3 are described below with reference to each element in FIG. 1.

Referring to FIG. 1 and FIG. 3 together, in step S310, the SDN controller 110 receives a packet-in message from an ingress node to obtain the service chaining information related to the packet flow.

In the present embodiment, the source node 101 transmits the packet flow including at least one network packet to the switch 120. A destination of the packet flow is the destination node 102. In the present embodiment, the switch 120 is the first switch that the packet flow encounters after entering the network communication system 100, and thus the switch 120 is referred to as the ingress node corresponding to the packet flow. When the packet flow is received from the source node 101, the switch 120 transmits a packet-in message to the SDN controller 110. For example, the packet-in message is used for inquiring the routing information of the packet flow. In the present embodiment, the packet-in message includes information, such as a source IP (Internet protocol) address, a destination IP address, a source port, a destination port, etc., of at least one network packet included in the corresponding packet flow. Further, in another embodiment, if the received packet flow contains the related service chaining information of its own, after capturing the service chaining information in the packet flow and encapsulating the service chaining information, the switch 120 may transmit the packet-in message containing the encapsulated service chaining information to the SDN controller 110.

In the present embodiment, in response to the received packet-in message, the SDN controller 110 inquires its own database (e.g., the storage circuit 220 in FIG. 2) in order to obtain the related service chaining information. According to the inquired service chaining information, the SDN controller 110 can learn that the packet flow needs to be processed by the first service and the second service, sequentially, before arriving to the destination node 102. Further, in another embodiment, if the packet-in message contains the service chaining information of one specific packet flow, the SDN controller 110 can de-encapsulate the service chaining information in the packet-in message to obtain information regarding that the packet flow needs to be processed by the first service and the second service before arriving to the destination node 102. Alternatively, after de-encapsulating the service chaining information in the packet-in message, the SDN controller 110 may also inquire its own database to obtain more information.

In step S320, according to the obtained service chaining information, the SDN controller 110 determines a routing path from multiple service nodes capable of providing one specific service to the ingress node.

In the present embodiment, after the information regarding that the packet flow needs to be processed by the first service and the second service before arriving to the destination node 102 is obtained, the SDN controller 110 first figures out which of the switches on the paths from the service nodes 131 to 134 among the first service clusters 130_1 and 130_2 to the switch 120 must be passed through. For instance, the SDN controller 110 may figure out that the switches 121 and 121_1 on the paths from the service nodes 131 and 132 to the switch 120 must be passed through, and the switches 121 and 121_2 on the paths from the service nodes 133 and 134 to the switch 120 must to be passed through.

In step S330, the SDN controller 110 determines a root switch corresponding to at least one service cluster for providing the specific service.

In the present embodiment, the SDN controller 110 determines a first root switch corresponding to the first service clusters 130_1 and 130_2 from among the switches according to all the figured-out paths between the service nodes 131 to 134 for providing the first service and the switch 120. In the present embodiment, a service aggregation point of the first service clusters 130_1 and 130_2 to the switch 120 is the switch 121, and thus the first root switch is set as the switch 121. When the packet flow from the switch 120 needs to be processed by the first service, the packet flow must pass through the first root switch (i.e., the switch 121) to be transmitted through a forwarding terminal of the first root switch to the next switch (e.g., the switches 121_1 or 121_2).

In common SDN network, the SDN controller 110 sets all the routing path information required by the service chaining into the data flow table and sends said information to each of the corresponding switches. In general, the data flow table includes a plurality of data flow entries, which are configured to record the routing path information. For example, one data flow entry may records the forwarding terminal of the corresponding switch in a manner of IP address and/or MAC (Media Access Control) address for routing the packet flow to a service node or a destination node. In the present embodiment, after the first root switch corresponding to the first service is determined, the SDN controller 110 further configures first routing path information. The first routing path information mentioned herein is for routing the packet flow from the switch 120 to the switch 121. For example, if there are still one or more switches on the path between the switch 120 and the switch 121, the first routing path information may be used for indicating how to chain up those switches.

In step S340, the SDN controller 110 configures group entry information for the root switch according to cluster information of at least one service cluster for providing the specific service. Herein, the group entry information is for performing a routing path selection of the packet flow corresponding to the service by the root switch.

In general, one switch may be stored with one or more group tables. Each group table may include one or more group entry information. The group table and the group entry mentioned herein may be, for example, those defined in the OpenFlow protocol, but the invention is not limited thereto. The group entry information controls certain advanced behaviors of the packet flow, such as broadcasting the packet or achieving the load balancing of the service nodes. Specifically, the group table may include the group entry information in four types, including "ALL", "SELECT", "INDIRECT" and "FAST FAILOVER". The group entry information of the "ALL" type is configured to instruct performing all action buckets in the group table; the group entry information of the "SELECT" type is configured to instruct performing one action bucket in the group table as selected by the SDN controller; the group entry information of the "INDIRECT" type is configured to instruct performing one action bucket that is preset or unique in the group table; the group entry information of the "FAST FAILOVER" type is configured to instruct performing one action bucket arranged at the first place (or with the number at one of the first few places) in the group table. In the group table of one switch, one action bucket is recorded with information regarding which connection port (also known as an output port) of the switch is the packet being outputted from.

Takes the switch 121 for example, it is assumed that a first connection port of the switch 121 is used to receive the packet flow from the switch 120, a second connection port of the switch 121 is used to output the packet flow to the switch 121_1, and a third connection port of the switch 121 is used to output the packet flow to the switch 121_2. In this case, according to the group entry information of "ALL" type, the switch 121 directly copies the packet flow received from the first connection port into two copies and outputs the two copies of the packet flow from both the second connection port and the third connection port; according to the group entry information of the "SELECT" type, the switch 121 outputs the packet flow received from the first connection port from the second connection port or the third connection port as selected by the SDN controller 110; according to the group entry information of the "INDIRECT" type, the switch 121 directly outputs the packet flow received from the first connection port from the only available (unique) output port (e.g., the second connection port); according to the group entry information of the "FAST FAILOVER" type, the switch 121 directly outputs the packet flow received from the first connection port from one connection port with the number at one of the first few places among the second connection port and the third connection port (e.g., the second connection port).

In the present embodiment, the SDN controller 110 sets the group entry information of the "SELECT" type in the group table of the switch 121. For example, the group entry information of the "SELECT" type corresponds to one of the action buckets included in the group table of the switch 121 and is for performing the routing path selection of the packet flow corresponding to the first service by the switch 121. For example, the group entry information of the "SELECT" type may be used to instruct the switch 121 to output the packet flow from which port. Accordingly, the switch 121 may output the packet flow from one specific port to one specific service cluster for providing the first service according to the group entry information of "SELECT" type.

In order to describe the implementation of step S340 in which the SDN controller 110 configures the group entry information for the root switch more clearly, step S340 is further divided into steps S410 to S420.

Figure 4:
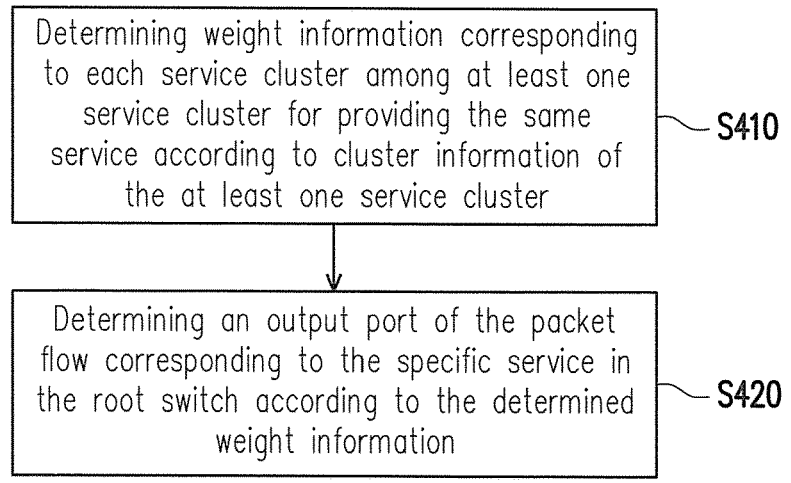
FIG. 4 is a flowchart illustrating configuration of the group entry information for the switch according to an embodiment of the invention.

FIG. 4 is a flowchart illustrating configuration of the group entry information for the switch according to an embodiment of the invention.

Referring to FIG. 4, in step S410, the SDN controller 110 determines weight information corresponding to each service cluster among at least one service cluster for providing the same service (e.g., the first service) according to cluster information of the at least one service cluster.

In the present embodiment, the weight information of each service cluster includes a total number of the service nodes included by the respective service cluster. In order to achieve the load balancing of multiple service clusters (or service nodes) for providing the same service, the weight information of a specific service cluster positively correlated to the total number of the service nodes included in the specific service cluster. When there is more service nodes included in the specific service cluster, the weight information of the specific service cluster may be set as a greater value. In one embodiment, the weight information is expressed by a weight value. For instance, the first service cluster 130_1 includes the service nodes 131 and 132, and thus the weight information of the first service cluster 130_1 may be set as 2. The first service cluster 130_2 includes the service nodes 133 and 134, and thus the weight information of the first service cluster 130_2 may also be set as 2.

In step S420, the SDN controller 110 determines an output port of the packet flow corresponding to the specific service in the root switch according to the weight information. The information of the output port is included in the group entry information of the "SELECT" type set, by the SDN controller 110, in the group table of the switch.

In the present embodiment, after the weight information respectively corresponding to the first service clusters 130_1 and 130_2 are calculated by the SDN controller 110, the SDN controller 110 performs a hash operation respectively corresponding to the first service clusters 130_1 and 130_2 to obtain corresponding hash reference values. For instance, the SDN controller 110 performs the hash operation on destination information of the packet flow, identification information of the first root switch and index information of the first service clusters 130_1 or 130_2, so as to obtain the hash reference value.

It should be noted that, in the present embodiment, the hash operation includes three parameters: the destination information of the packet flow, the identification information of the root switch and the index information of the service cluster. Nonetheless, the hash operation may include three or more parameters depending on user's setting, and the invention is not intended to particularly limit those parameters. For instance, the destination information of the packet flow is, for example, a destination address of the packet flow (e.g., IP or MAC address). The identification information of the root switch may be an identification information of the root switch itself, such as its own MAC address, IP address or routing path ID information. The index information of the service cluster is, for example, a number of one specific service cluster (hereinafter, also known as a cluster number). For example, it is assumed that the cluster number of the service cluster 130_1 is 1 and the cluster number of the service cluster 130_2 is 2. In this case, the SDN controller 110 may calculate the hash reference value corresponding to the first service cluster 130_1 according to the destination information of the packet flow, the identification information of the root switch and the cluster number (e.g., 1) of the service cluster 130_1, and calculate the hash reference value corresponding to the first service cluster 130_2 according to the destination information of the same packet flow, the identification information of the same root switch and the cluster number (e.g., 2) of the service cluster 130_2. For example, the parameters may be inputted to a hash function, where an output of the hash function is the corresponding hash reference value. In addition, the hash function may also be other types of function which is generated by, for example, a random number generating function.

The SDN controller 110 then determines the output port of the packet flow corresponding to the first service in the first root switch according to the calculated hash reference value and the weight information. For example, the SDN controller 110 may multiply the hash reference value corresponding to the first service cluster 130_1 by the weight information corresponding to the first service cluster 130_1 to obtain one value (hereinafter, also known as a first value). For example, the SDN controller 110 may multiply the hash reference value corresponding to the first service cluster 130_2 by the weight information corresponding to the first service cluster 130_2 to obtain another value (hereinafter, also known as a second value). Then, the SDN controller 110 compares the first value with the second value and determines the output port of the packet flow corresponding to the first service in the switch 121 according to a result of such comparison. For example, if the first value is greater than the second value, the SDN controller 110 determines to set the output port of the packet flow corresponding to the first service in the switch 121 as the second connection port, so as to route the received packet flow through the second connection port to the first service cluster 130_1 which provides the first service. Conversely, if the first value is less than the second value, the SDN controller 110 determines to set the output port of the packet flow corresponding to the first service in the switch 121 as the third connection port, so as to route the received packet flow through the third connection port to the first service cluster 130_2 which also provides the first service.

In the present embodiment, the SDN controller 110 records the information of the output port corresponding to the first service in the switch 121 into the group table in the switch 121 by utilizing the first group entry information of the "SELECT" type. For example, the SDN controller 110 sends a setting message to instruct storing the first group entry information into the group table of the switch 121. Accordingly, when the packet flow is received from the switch 120, the switch 121 may perform the routing path selection of the packet flow corresponding to the first service according to the first group entry information, and thus output the packet flow through the set output port to one of the first service clusters 130_1 or 130_2 for processing.

Next, referring back to FIG. 3, in step S350, the SDN controller 110 determines whether it is still required to configure the routing information for other services according to the service chaining information. If so, steps S320 to S340 are executed again.

In the present embodiment, because the packet flow still needs to be processed by the second service, the S320 to S340 are to be executed again in correspondence to the second service. For example, in the step S320 being executed again, the SDN controller 110 figures out which of the switches on the paths from the service nodes 141 to 145 among the second service clusters 140_1 and 140_2 to the ingress node (i.e., the switch 120) must be passed through. Further, in another embodiment, the SDN controller 110 figures out which of the switches on the paths from the service nodes 141 to 145 among the second service clusters 140_1 and 140_2 to the first root switch (i.e., the switch 121) must be passed through.

In the step S330 being executed again, the SDN controller 110 determines a second root switch corresponding to the second service clusters 140_1 and 140_2 from among the switches according to all the figured-out paths of the service nodes 141 to 145 for providing the second service to the switch 120 (or the switch 121). In the present embodiment, a service aggregation point of the second service clusters 140_1 and 140_2 to the switch 120 (or the switch 121) is the switch 122, and thus the second root switch is set as the switch 122. When the packet flow processed by the first service returns back to the switch 121 and needs to be processed by the second service, the packet flow must pass through the second root switch (i.e., the switch 122) to be transmitted through a forwarding terminal of the second root switch to the next switch (e.g., the switches 122_1 or 122_2).

In the step S340 being executed again, the SDN controller 110 sets the group entry information of the "SELECT" type in the group table of the switch 122. For example, the group entry information of the "SELECT" type is for performing a routing path selection of the packet flow corresponding to the second service by the switch 122.

In the present embodiment, the SDN controller 110 may also configure second group entry information according to steps S410 to S420.

First, the SDN controller 110 determines weight information corresponding to the second service clusters 140_1 and 140_2, respectively, according to cluster information of the second service clusters 140_1 and 140_2 for providing the second service. For instance, the second service cluster 140_1 includes the service nodes 141 to 143, and thus the weight information of the second service cluster 140_1 may be set as 3. The second service cluster 140_2 includes the service nodes 144 and 145, and thus the weight information of the second service cluster 140_2 may also be set as 2. Herein, the second service clusters 140_1 and 140_2 include different numbers of the service nodes and the number (i.e., total number) of the service nodes included by the second service cluster 140_1 is relatively more, and thus the second service cluster 140_1 has the weight information greater than the weight information of the second service cluster 140_2.

After the weight information respectively corresponding to the second service clusters 140_1 and 140_2 are calculated by the SDN controller 110, the SDN controller 110 performs a hash operation respectively corresponding to the second service clusters 140_1 and 140_2 to obtain corresponding hash reference values. As similar to the embodiment of the hash operation performed corresponding to the first service, it is assumed that the cluster number of the service cluster 140_1 is 3 and the cluster number of the service cluster 140_2 is 4. Accordingly, the SDN controller 110 may then calculate the hash reference value corresponding to the second service cluster 140_1 according to the destination information of the packet flow, the identification information of the root switch and the cluster number (e.g., 3) of the service cluster 140_1, and calculate the hash reference value corresponding to the second service cluster 140_2 according to the destination information of the packet flow, the identification information of the root switch and the cluster number (e.g., 4) of the service cluster 140_2.

The SDN controller 110 then determines the output port of the packet flow corresponding to the second service in the second root switch according to the calculated hash reference value and the weight information. For example, the SDN controller 110 may multiply the hash reference value corresponding to the second service cluster 140_1 by the weight information corresponding to the second service cluster 140_1 to obtain one value (hereinafter, also known as a third value). For example, the SDN controller 110 may multiply the hash reference value corresponding to the second service cluster 140_2 by the weight information corresponding to the second service cluster 140_2 to obtain another value (hereinafter, also known as a fourth value). Then, the SDN controller 110 compares the third value with the fourth value and determines the output port of the packet flow corresponding to the second service in the switch 122 according to a result of such comparison. For example, if the third value is greater than the fourth value, the SDN controller 110 determines to set the output port of the packet flow corresponding to the second service in the switch 122 as one specific connection port, so as to route the received packet flow through the specific connection port to the second service cluster 140_1 which provides the second service. Conversely, if the third value is less than the fourth value, the SDN controller 110 determines to set the output port of the packet flow corresponding to the second service in the switch 122 as another connection port, so as to route the received packet flow through the said another connection port to the second service cluster 140_2 which also provides the second service.

Thereafter, the SDN controller 110 records the information of the output port corresponding to the second service in the switch 122 into the group table in the switch 122 by utilizing the second group entry information of the "SELECT" type. For example, the SDN controller 110 sends a setting message to instruct storing the second group entry information into the group table of the switch 122. Accordingly, when the packet flow is received from the switch 121, the switch 122 may perform the routing path selection of the packet flow corresponding to the second service according to the second group entry information, and thus output the packet flow through the set output port to one of the second service clusters 140_1 and 140_2 for processing.

In step S350, the SDN controller 110 determines whether it is still required to configure the routing information for other services according to the service chaining information. If not, the method proceeds to step S360.

In step S360, the SDN controller 110 determines at least one routing path for chaining the root switches of each service.

In the present embodiment, the SDN controller 110 determines a routing path chaining between the first root switch and the second root switch. For example, because it is determined that the first root switch is the switch 121 and the second root switch is the switch 122 in the aforesaid steps, the SDN controller 110 may configure first routing path information for routing the packet flow from the ingress node (i.e., the switch 120) to the switch 121, second routing path information for routing the packet flow from the switch 121 to the switch 122 and third routing path information for routing the packet flow from the switch 122 to a second target switch (i.e., the switch 123). In the present embodiment, after being processed by the first service and the second service, the packet flow may be transmitted through the switch 123 to the destination node 102. The switch 123 is the last switch that the packet flow passes before arriving to the destination node 102 after completing all the services, and thus the switch 123 may be referred to as an egress node corresponding to the packet flow.

In step S370, the SDN controller 110 assigns one service path identification code for the routing path determined in step S360. In step S380, the SDN controller 110 configures the data flow table to each of the switches, and transmits a packet-out message back to the ingress node.

In the present embodiment, after the routing path chaining of the switches 120, 121, 122 and 123 for routing the packet flow from the source node 101 to the destination node 102 is determined, the SDN controller 110 assigns one or more service path identification codes for the routing path. It should be noted that, the service path identification code may be expressed in any form, which is not particularly limited by the invention. The SDN controller 110 may use one service path identification code as a matching condition and send a setting message to instruct storing the information—the first routing path information between the switch 120 and the switch 121 corresponding to the service path identification code, together with the service path identification code—into the data flow table of the switch 120. Similarly, the SDN controller 110 may also use one service path identification code as a matching condition and send a setting message to instruct storing the information the second routing path information between the switch 121 and the switch 122 corresponding to the service path identification code, the third routing path information between the switch 122 and the switch 123 corresponding to the service path identification code, together with the corresponding service path identification codes—into the data flow tables of the switch 121 and the switch 122. After storing routing setting into those switches, the SDN controller 110 transmits the packet-out message back to the ingress node (i.e., the switch 120), so as to notify the ingress node that the routing setting of the packet flow is completed. In the present embodiment, the packet-out message contains information regarding the completed routing setting.

After the routing configuration in step S310 to S380 is completed, the ingress node (i.e., the switch 120) puts the corresponding service path identification code into the packet flow to match the service path identification code and the routing path information stored in each of the switches (i.e., the switches 120, 121 and 122) on the routing path. In this way, when the service path identification code carried by the packet flow matches the service path identification code stored by the switch 120, the switch 120 may route the packet flow to the switch 121 corresponding to the first service by utilizing the data flow table entries corresponding to the matched service path identification code. Next, the switch 121 routes the packet flow by utilizing the first group entry information configured by the SDN controller 110.

After being processed by the first service, the packet flow returns back to the switch 121. Then, the switch 121 may continue to match the service path identification code, and route the packet flow to the switch 122 corresponding to the second service by utilizing the data flow table entries corresponding to the matched service path identification code. Next, the switch 122 routes the packet flow by utilizing the second group entry information configured by the SDN controller 110.

After being processed by the second service, the packet flow returns back to the switch 122. Then, the switch 122 may continue to match the service path identification code, and route the packet flow to the switch 123 by utilizing the data flow table entries corresponding to the matched service path identification code. In the present embodiment, when the packet flow arrives to the switch 123, the switch 123 removes the service path identification code from the packet flow. Finally, the switch 123 transmits the packet flow to the destination node 102.

In brief, the network communication system, the SDN controller and the routing method thereof according to the embodiments of the invention are capable of determining at least one root switch respectively corresponding to one specific service according to the service chaining information of the packet flow, and configuring the group entry information used in the routing path selection for each root switch according to the cluster information of at least one service cluster corresponding to the respective root switch. Accordingly, by setting the group entry information, the service chaining controlled by the SDN controller is capable of chaining only one or more root switches on the routing path instead of chaining each one of the switches. The root switch may determine to route the corresponding packet flow to a specific service cluster (or service node) among the corresponding service clusters according to the group entry information configured by the SDN controller. In this case, in addition to the load balancing of the multiple service nodes for providing the same service, the loading of the SDN controller for configuring and storing the data flow table may also be reduced.

It is worth mentioning that, the invention is not intended to limit the group entry information only to be configured in the root switch. In another embodiment of the invention, the SDN controller 110 is also capable of configuring corresponding group entry information (hereinafter, also known as sub group entry information) for at least one switch (hereinafter, also known as a sub switch) between the root switch and the corresponding multiple service clusters. As such, when the packet flow is routed to one specific sub switch through the routing path selection of the root switch, the sub switch may perform a corresponding routing path selection (also known as a sub routing path selection) according to the configured sub group entry information, so as to further route the packet flow to the corresponding service cluster or service node.

Figure 5:
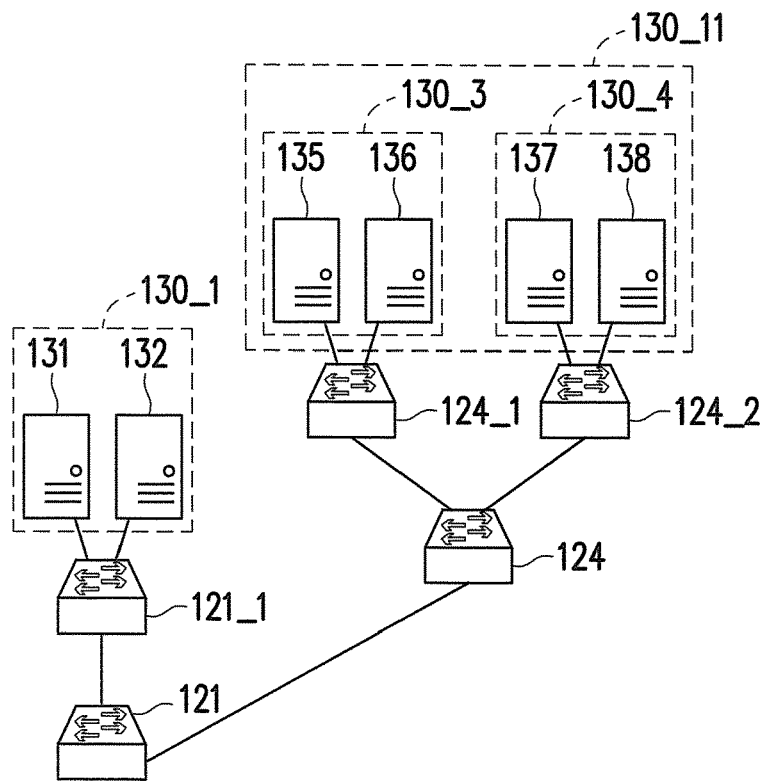
FIG. 5 is a schematic diagram illustrating a network communication system according to another embodiment of the invention.

FIG. 5 is a schematic diagram illustrating a network communication system according to another embodiment of the invention. Referring to FIG. 5, in the present embodiment, it is assumed that the service nodes 131, 132, 135, 136, 137 and 138 among the service clusters 130_1, 130_3 and 130_4 are for providing the first service. Accordingly, the switch 121 is then set as the root switch corresponding to the service clusters 130_1, 130_3 and 130_4 for providing the first service. Because there are still the switches 121_1, 124, 124_1 and 124_2 between the switch 121 and the service clusters 130_1, 130_3 and 130_4, the SDN controller 110 may further configure the corresponding group entry information for at least one of the switches 121_1, 124, 124_1 and 124_2.

In the present embodiment, when the SDN controller 110 configures the group entry information for the switch 121, the SDN controller 110 may determine the weight information respectively corresponding to the service clusters 130_1 and 130_11 according to cluster information of the service clusters 130_1 and 130_11 for providing the first service. Herein, the service cluster 130_11 includes the service clusters 130_3 and 130_4. Each of the service clusters 130_3 and 130_4 may be considered as one sub service cluster of the service cluster 130_11. For instance, since the service cluster 130_1 includes the service nodes 131 and 132, the weight information of the service cluster 130_1 may be set as 2. Since the service cluster 130_11 includes the service nodes 135 to 138, the weight information of the service cluster 130_11 may be set as 4. Description regarding how to set the weight information corresponding to the different service clusters has been provided in detail above, which is not repeated hereinafter.

The SDN controller 110 may perform the hash operation respectively corresponding to the service clusters 130_1 and 130_11 to obtain the corresponding hash reference values. As similar to the example of performing the hash operation in the foregoing embodiment, the SDN controller 110 may calculate for the different hash reference values according to the cluster numbers of the service clusters 130_1 and 130_11. For example, according to the cluster number and related information corresponding to the service cluster 130_1, one hash reference value corresponding to the service cluster 130_1 may be calculated; according to the cluster number and related information corresponding to the service cluster 130_11, another hash reference value corresponding to the service cluster 130_11 may also be calculated.

The SDN controller 110 may obtain one value according to the hash reference value and the weight information corresponding to the service cluster 130_1 and obtain another value according to the hash reference value and the weight information corresponding to the service cluster 130_11. The SDN controller 110 determines one output port in the switch 121 according to said two values (e.g., a greater one among the two values), so as to determine to output the packet flow through such output port to the corresponding service cluster (i.e., the service cluster 130_1 or the service cluster 130_11). For example, the SDN controller 110 records the information of the determined output port into the group table in the switch 121 by utilizing the group entry information of the "SELECT" type.

On the other hand, the SDN controller 110 may also configure the sub group entry information for the sub switch (i.e., the switch 124). For example, according to the total (i.e., total number) of the service nodes included by each of the service clusters 130_3 and 130_4, the SDN controller 110 may respectively set the weight information of the service clusters 130_3 and 130_4 as 2. The SDN controller 110 may further calculate for two hash reference values respectively corresponding to the service clusters 130_3 and 130_4 according to information such as the cluster numbers of the service clusters 130_3 and 130_4. According to the calculated hash reference values and weight information, the SDN controller 110 may determine one output port of the switch 124, so as to route the packet flow through such output port to the corresponding service cluster (i.e., the service clusters 130_3 or 130_4). For example, the SDN controller 110 records the information of the determined output port into the group table in the switch 124 by utilizing the group entry information of the "SELECT" type.

In one embodiment, the SDN controller 110 may further configure information related to routing path selection for the rest of switches in FIG. 1 and FIG. 5, by utilizing group entry information of the "SELECT" type, so as to reduce the loading of the data flow table in the SDN controller 110 and/or other switches. In addition, the SDN controller 110 and/or any one switch in FIG. 1 and FIG. 5 may also adopt use of other load balancing and/or traffic control mechanisms, which are not particularly limited by the invention.

In summary, in the network communication system, the SDN controller and the routing method thereof according to the embodiments of the invention, the SDN controller only needs to control the service chaining of the root switches and establishment of the routing paths thereof, whereas the selection of the service nodes may be separately performed by using the group table of each root switch. As a result, the loading of the SDN controller may be reduced while achieving the load balancing of the service nodes.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A routing method, adapted to a software-defined network (SDN) controller, the routing method comprising:
determining a first root switch corresponding to at least one first service cluster according to service chaining information, wherein each service cluster among the at least one first service cluster comprises at least one service node for providing a first service;
determining first routing path information for routing a packet flow from a first target switch to the first root switch; and
configuring first group entry information for the first root switch according to cluster information of the at least one first service cluster,
wherein the first group entry information is for performing a first routing path selection of the packet flow corresponding to the first service by the first root switch.

2. The routing method of claim 1, further comprising:
determining a second root switch corresponding to at least one second service cluster according to the service chaining information, wherein each service cluster among the at least one second service cluster comprises at least one service node for providing a second service;
determining second routing path information for routing the packet flow from the first root switch to the second root switch; and
configuring second group entry information for the second root switch according to cluster information of the second service cluster,
wherein the second group entry information is for performing a second routing path selection of the packet flow corresponding to the second service by the second root switch.

3. The routing method of claim 2, further comprising:
determining third routing path information for routing the packet flow from the second root switch to a second target switch after the second root switch is determined.

4. The routing method of claim 1, wherein the cluster information of the at least one first service cluster comprises a total number of the service node included in each service cluster among the at least one first service cluster.

5. The routing method of claim 1, further comprising:
determining a sub switch corresponding to at least one sub service cluster of the at least one first service cluster; and
configuring sub group entry information for the sub switch according to cluster information of the at least one sub service cluster,
wherein the sub group entry information is for performing a sub routing path selection of the packet flow corresponding to the first service from the first root switch by the sub switch.

6. The routing method of claim 1, wherein the first root switch is an aggregation point of the at least one first service cluster.

7. The routing method of claim 1, wherein the step of configuring the first group entry information for the first root switch according to the cluster information of the at least one first service cluster comprises:
determining weight information corresponding to each service cluster among the at least one first service cluster according to the cluster information of the at least one first service cluster; and
determining an output port of the packet flow corresponding to the first service in the first root switch according to the weight information.

8. The routing method of claim 7, wherein the step of determining the output port of the packet flow corresponding to the first service in the first root switch according to the weight information comprises:
performing a hash operation on destination information of the packet flow, identification information of the first root switch and index information of one specific service cluster among the at least one first service cluster, so as to obtain a hash reference value; and
determining the output port of the packet flow corresponding to the first service in the first root switch according to the hash reference value and the weight information.

9. The routing method of claim 7, wherein the output port is for outputting the packet flow to one specific service cluster among the at least one first service cluster.

10. The routing method of claim 1, further comprising:
sending a first setting message, wherein the first setting message is for storing the first routing path information into a data flow table of the first target switch; and
sending a second setting message, wherein the second setting message is for storing the first group entry information into a group table of the first root switch.

11. A software-defined network controller, comprising:
a network interface circuit;
a storage circuit, configured to store service chaining information;
a processing circuit, coupled to the network interface circuit and the storage circuit,
wherein the processing circuit is configured to determine a first root switch corresponding to at least one first service cluster according to the service chaining information, wherein each service cluster among the at least one first service cluster comprises at least one service node for providing a first service,
wherein the processing circuit is further configured to determine first routing path information for routing a packet flow from a first target switch to the first root switch,
wherein the processing circuit is further configured to configure first group entry information for the first root switch according to cluster information of the at least one first service cluster,
wherein the first group entry information is for performing a first routing path selection of the packet flow corresponding to the first service by the first root switch.

12. The software-defined network controller of claim 11, wherein the processing circuit is further configured to determine a second root switch corresponding to at least one second service cluster according to the service chaining information, wherein each service cluster among the at least one second service cluster comprises at least one service node for providing a second service,
wherein the processing circuit is further configured to determine second routing path information for routing the packet flow from the first root switch to the second root switch,
wherein the processing circuit is further configured to configure second group entry information for the second root switch according to cluster information of the at least one second service cluster,
wherein the second group entry information is for performing a second routing path selection of the packet flow corresponding to the second service by the second root switch.

13. The software-defined network controller of claim 12, wherein the processing circuit is further configured to determine third routing path information for routing the packet flow from the second root switch to a second target switch after the second root switch is determined.

14. The software-defined network controller of claim 11, wherein the cluster information of the at least one first service cluster comprises a total number of the service node included in each service cluster among the at least one first service cluster.

15. The software-defined network controller of claim 11, wherein the processing circuit is further configured to determine a sub switch corresponding to at least one sub service cluster of the at least one first service cluster,
  wherein the processing circuit is further configured to configure sub group entry information for the sub switch according to cluster information of the at least one sub service cluster,
  wherein the sub group entry information is for performing a sub routing path selection of the packet flow corresponding to the first service from the first root switch by the sub switch.

16. The software-defined network controller of claim 11, wherein the first root switch is an aggregation point of the at least one first service cluster.

17. The software-defined network controller of claim 11, wherein the operation of configuring the first group entry information for the first root switch according to the cluster information of the at least one first service cluster by the processing circuit comprises:
  determining weight information corresponding to each service cluster among the at least one first service cluster according to the cluster information of the at least one first service cluster; and
  determining an output port of the packet flow corresponding to the first service in the first root switch according to the weight information.

18. The software-defined network controller of claim 17, wherein the operation of determining the output port of the packet flow corresponding to the first service in the first root switch according to the weight information by the processing circuit comprises:
  performing a hash operation on destination information of the packet flow, identification information of the first root switch and index information of one specific service cluster among the at least one first service cluster, so as to obtain a hash reference value; and
  determining the output port of the packet flow corresponding to the first service in the first root switch according to the hash reference value and the weight information.

19. The software-defined network controller of claim 17, wherein the output port is for outputting the packet flow to one specific service cluster among the at least one first service cluster.

20. The software-defined network controller of claim 11, wherein the processing circuit is further configured to send a first setting message through the network interface circuit, wherein the first setting message is for storing the first routing path information into a data flow table of the first target switch,
  wherein the processing circuit is further configured to send a second setting message through the network interface circuit, wherein the second setting message is for storing the first group entry information into a group table of the first root switch.

21. A network communication system, comprising:
an SDN controller and a plurality of switches,
wherein the SDN controller is configured to determine a first root switch corresponding to at least one first service cluster and a second root switch corresponding to at least one second service cluster from among the switches according to service chaining information, wherein each service cluster among the at least one first service cluster comprises at least one service node for providing a first service, wherein each service cluster among the at least one second service cluster comprises at least one service node for providing a second service,
wherein the SDN controller is further configured to determine routing path information for routing a packet flow from the first root switch to the second root switch,
wherein the SDN controller is further configured to configure first group entry information for the first root switch according to cluster information of the at least one first service cluster and configure second group entry information for the second root switch according to cluster information of the at least one second service cluster,
wherein the first root switch is configured to perform a first routing path selection of the packet flow corresponding to the first service according to the first group entry information,
wherein the second root switch is configured to perform a second routing path selection of the packet flow corresponding to the second service according to the second group entry information.

22. The network communication system of claim 21, wherein the routing path information is stored in a data flow table of the first root switch,
  wherein the first group entry information and the second group entry information are stored in group tables of the first root switch and the second root switch respectively.

* * * * *